United States Patent [19]

Harris

[11] 4,209,476
[45] Jun. 24, 1980

[54] METHOD AND APPARATUS FOR FABRICATION OF EXTRUDED ARTICLES

[75] Inventor: Holton E. Harris, Westport, Conn.

[73] Assignee: Harrel, Incorporated, East Norwalk, Conn.

[21] Appl. No.: 970,152

[22] Filed: Dec. 18, 1978

Related U.S. Application Data

[63] Continuation-in-part of Ser. No. 801,078, May 27, 1977, abandoned.

[51] Int. Cl.² .................................................. B29F 3/06
[52] U.S. Cl. ................................... 264/40.4; 264/40.7; 264/209; 425/140; 425/145; 425/155
[58] Field of Search ................... 264/40.1, 40.4, 40.7, 264/209; 425/140, 145, 155

[56] References Cited
U.S. PATENT DOCUMENTS

| | | | |
|---|---|---|---|
| 3,154,810 | 11/1964 | Horne | 425/145 |
| 3,286,302 | 11/1966 | Doering | 425/145 |
| 3,619,433 | 11/1971 | Windley | 264/40.1 |
| 3,624,025 | 11/1971 | Twist | 264/40.4 |

Primary Examiner—Jeffery R. Thurlow
Attorney, Agent, or Firm—Parmelee, Johnson, Bollinger & Bramblett

[57] ABSTRACT

An improved method and apparatus is described for controlling an average dimensional characteristic of an article being extruded. This dimensional characteristic is determined from a predetermined volume of material supplied, from a measured dimensional characteristic and from a known cross sectional configuration. When the measured dimensional characteristic varies from a predetermined value, the volume of the stock material supplied is altered to restore the measured dimensional characteristic to the predetermined value.

20 Claims, 11 Drawing Figures

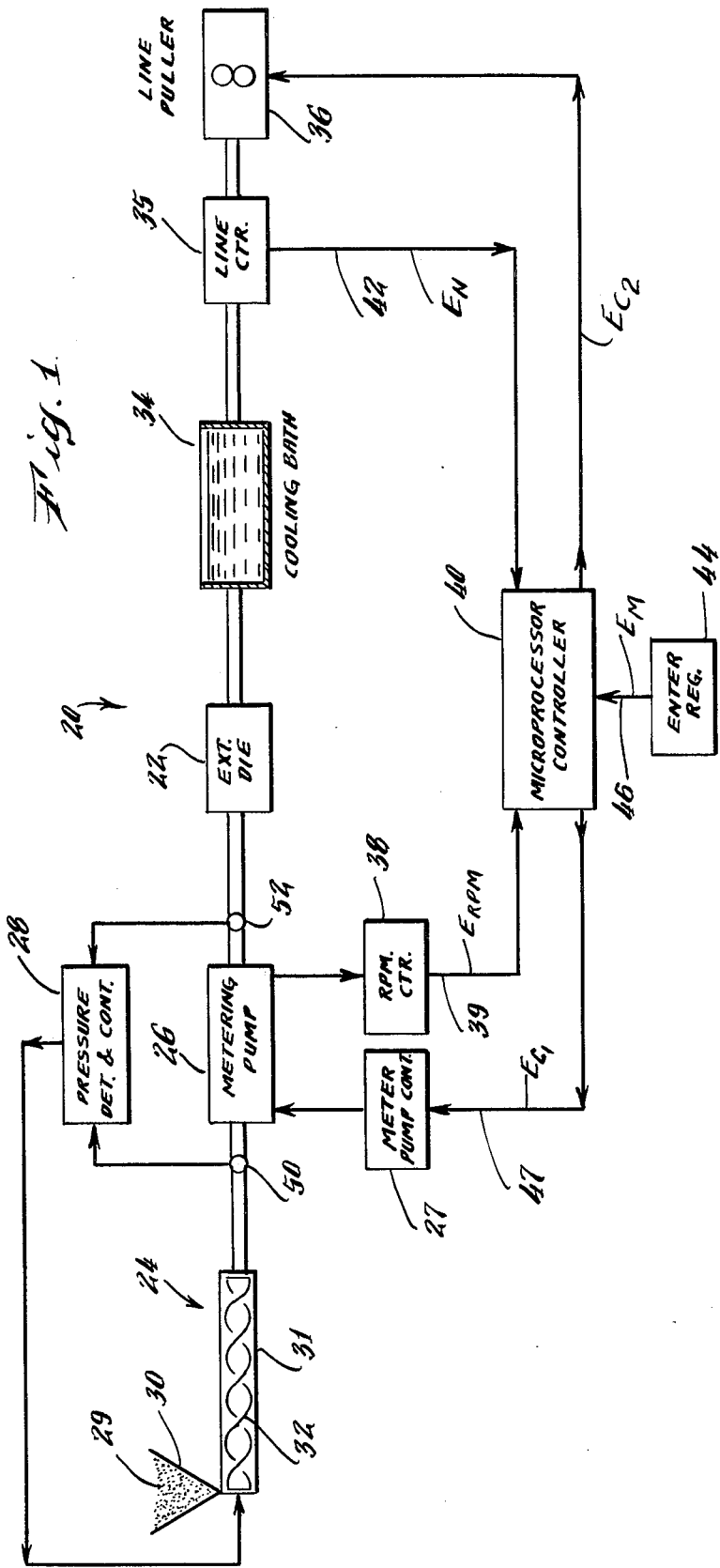
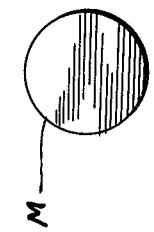

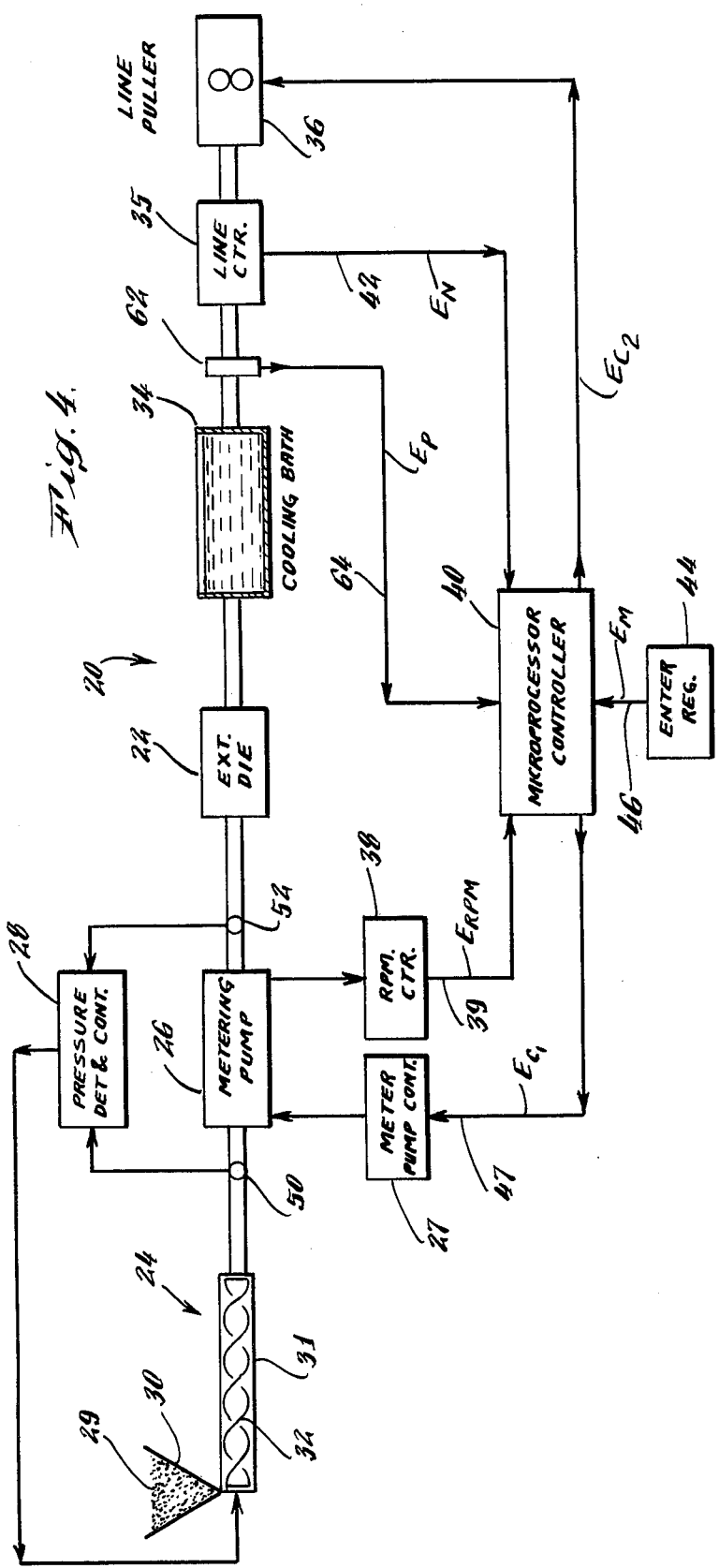
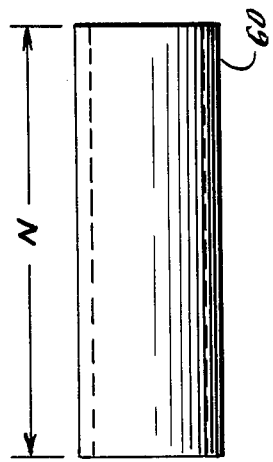
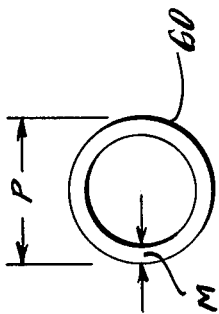

METHOD AND APPARATUS FOR FABRICATION OF EXTRUDED ARTICLES

This application is a continuation-in-part application of U.S. Ser. No. 801,078 filed May 27, 1977, now abandoned.

BACKGROUND OF THE INVENTION

This invention relates to a method and apparatus for forming an extrudate body. The invention relates more particularly to an improved method and apparatus for controlling an average dimensional characteristic of an extrudate body.

In an extrusion method for fabricating polymer plastic bodies of differing profiles or cross sectional configurations, an extrudate stock material in plasticized or liquid form is supplied to and forced through a die having an orifice of desired cross sectional configuration and dimensions. An extrudate output from the die comprises a solid, elongated body having the desired profile or a tubular body having cross sectional configuration. The extrudate may be a sheet, a rod, a tube, or other more complex configuration.

In various applications, it is desirable to maintain the cross sectional dimensional characteritics of the extrudate within a predetermined range of values. The dimensional characteristics which are principally defined by the size of the orifice are, however, subject to variation with temperature, pressure, etc. In order to sense profile dimensional variations, a measuring means has been provided for measuring a dimensional characteristic of the extrudate and for adjusting the process to maintain the dimensional characteristic within a desired range of values. In an exemplary process, the average wall thickness of an extruded plastic pipe or tubing is measured by a nuclear gauge of the back scatter type, or, alternatively by an ultrasonic gauge. These devices are adapted to measure the wall thickness at the location of the gauge. However, since the wall thickness is susceptible to variation about the periphery of the tube, a measurement at a single, peripheral location is not determinative of uniformity in wall thickness of the tube. An average wall thickness has been measured by rotating the gauge about the tubulation with the use of a rotary scanning mount thereby enabling the measurement of the thickness at a number of locations about the periphery of the tube and enabling the calculation of the average thickness of the tube.

Although the described exemplary measuring arrangement is adequate with relatively large diameter tubing, such as tubing having an outside diameter of ¾ of an inch or greater, and with other forms of configurations, the dimensional resolutions of the aforementioned measuring gauges are unsatisfactory when it is desired to determine the average tubulation thickness for tubing of relatively smaller outside diameter. With these small diameters, the effective spot size of the nuclear gauge is too large and focusing and sighting with an ultrasonic gauge is relatively difficult.

Accordingly, it is an object of this invention to provide an improved method and apparatus for the fabrication of a polymer plastic extrudate.

Another object of the invention is to provide an improved method and apparatus for determining and controlling an average cross sectional dimensional characteristic of an extrudate.

A further object of the invention is to provide an improved method and apparatus for the indirect measurement of an average cross sectional dimensional characteristic of an extrudate.

SUMMARY OF THE INVENTION

In accordance with features of the method of this invention, an extrudate stock material is supplied at a substantially uniform volumetric rate (V/t) to an extruding die having an orifice which provides an extrudate of predetermined profile. The extrudate has dimensional characteristics (M), (N) and (P). The dimensional characteristic (N) is measured over an interval of time (t) and an average value ($M_a$) of the dimensional characteristic (M) is determined from the measured dimensional characteristic (N), from the volumetric supply rate (V/t), and from the predetermined cross sectional configuration. Variations occurring between the average value ($M_a$) and a predetermined average value ($M_{ar}$) are determined and the extrudate volumetric supply rate (V/t) is varied for restoring the average value ($M_a$) to the predetermined average value ($M_{ar}$). In accordance with other features of the invention, the dimensional characteristic (P) is also measured and is utilized with the measured characteristic (N) in determining a variation from the predetermined value ($M_{ar}$).

In an exemplary method for controlling the average cross sectional area (M) of an extrudate rod, the length (N) of the extrudate rod over an interval of time (t) is measured. The cross sectional area of the rod is known from the relationship $M = \pi R^2$. The volume of a length (N) of an extrudate rod is $V = N \times M$. Since the volumetric rate (V/t) is known and since N/t is measured, then the average cross sectional area ($M_a$) can be determined. Variations between ($M_a$) and a predetermined volume ($M_{ar}$) are sensed and the volumetric supply (V/t) is varied to restore ($M_a$) to ($M_{ar}$). Determination and control of a dimensional characteristic such as the thickness of an extrudate tube is accomplished through the measurement of another dimensional characteristic, as for example, the outside diameter (P) of the tube.

In accordance with features of the apparatus of the invention, an extruding means is provided and a metering pump means supplies an extrudate stock material in a plasticized or liquid form to the die means. Means are provided for measuring a dimensional characteristic (N) of the extrudate over an interval of time (t) and providing an indication thereof. A means is provided for determining from the measured dimensional characteristic (N), from the volumetric supply rate (V/t) and from the predetermined cross sectional configuration of the extrudate the average value ($M_a$) of the extrudate. Variations between this determined value and a predetermined value ($M_{ar}$) are determined. Means are provided for varying the volumetric supply rate (V/t) to restore the determined value ($M_a$) to the predetermined value ($M_{ar}$).

In accordance with other features of the apparatus of this invention, a means is provided for maintaining a predetermined pressure differential across the metering pump means. A means is provided for sensing the pressure differential and for varying the rate at which extrudate stock is supplied to the metering pump means for maintaining the pressure differential at the predetermined value. An alternate method is to maintain the pressure constant at the input to the pump.

In accordance with another feature of the apparatus, a gravimetric or volumetric feeder means is provided for supplying extrudate stock material to an extruder. The extruder output of plasticized or liquid extrudate is supplied at a substantially constant supply rate to a die means by controlling the feeder output. Means are provided for maintaining and controlling the feeder output to control the dimensional characteristics of the extruded article in the manner previously set forth.

BRIEF DESCRIPTION OF THE DRAWINGS

These and other features of the invention will become apparent with reference to the following specification and to the drawings wherein:

FIG. 1 is a schematic diagram of an apparatus constructed in accordance with features of this invention for controlling the average thickness of an extrudate of rod shaped configuration;

FIG. 2 is a front elevation view of a rod extruded by the apparatus of FIG. 1;

FIG. 3 is a side elevation view of the rod of FIG. 2 illustrating a profile thereof;

FIG. 4 is a schematic diagram of an apparatus constructed in accordance with features of this invention for controlling the average thickness of an extrudate of tubular configuration;

FIG. 5 is a front elevation view of a tube extruded by the apparatus of FIG. 4;

FIG. 6 is a side elevation view of the tube of FIG. 5 illustrating a profile thereof;

DETAILED SPECIFICATIONS

Figure 7:
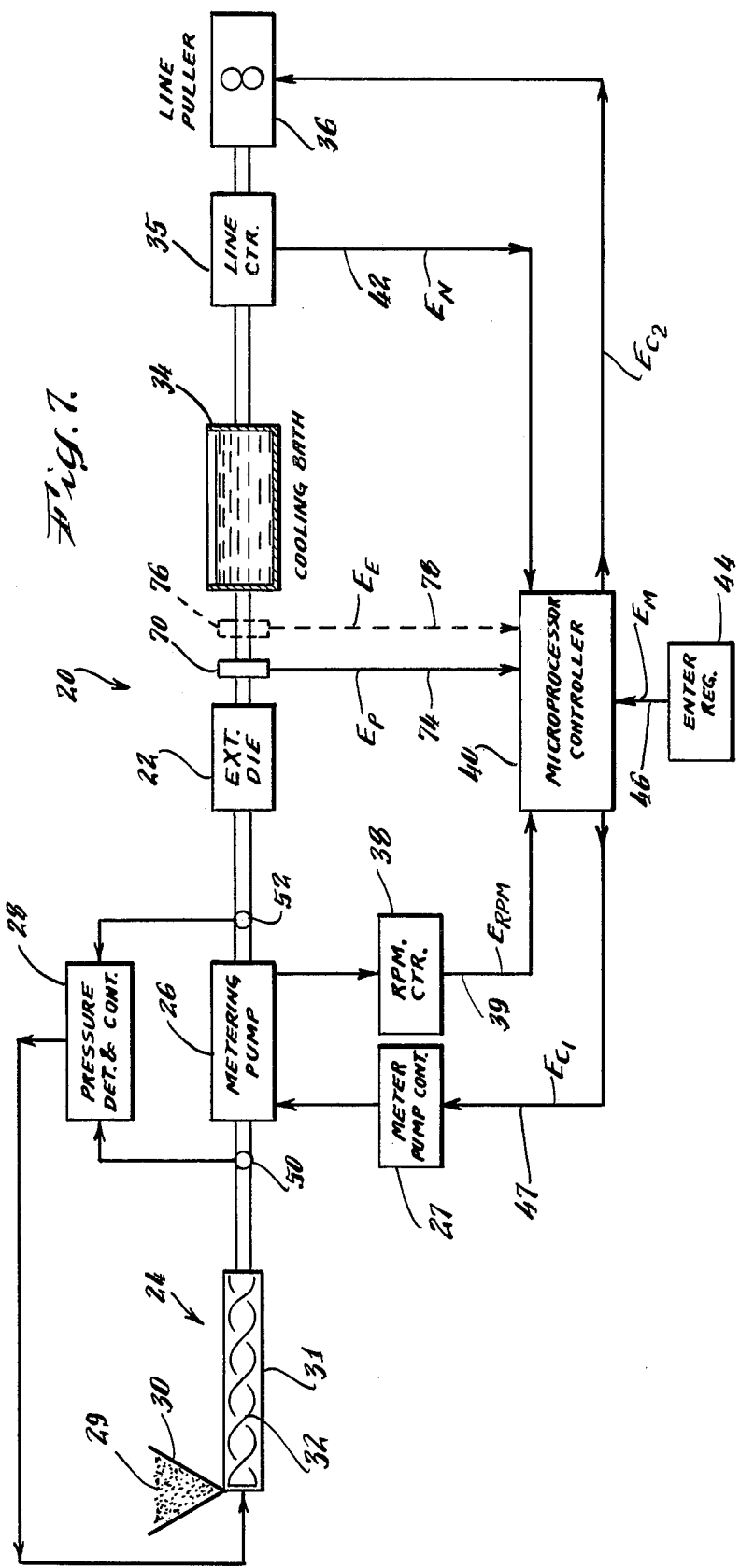
FIG. 7 is a schematic diagram of an apparatus constructed in accordance with features of this invention for controlling the average thickness of an extrudate sheet.
Figure 9:
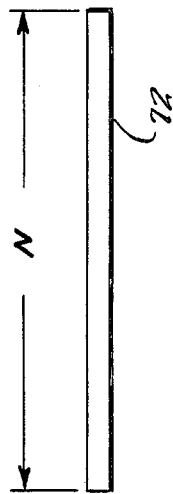
FIG. 9 is a side elevation view of the sheet of FIG. 8 illustrating a profile thereof.

Referring now to FIGS. 1-3, an extrusion apparatus constructed in accordance with features of the present invention and referred to generally by reference numeral 20 includes a means for supplying an extrudate stock at a substantially uniform volumetric rate (V/t) to an extruding die block 22. Die block 22 includes an extrusion orifice which is formed by members thereof and has a predetermined profile or cross section through which the plasticized or liquid extrudate is forced to provide a continuous extrudate output of predetermined cross sectional configuration. The extrudate supply means comprises an extruder referred to generally as 24, a metering pump referred to generally as 26, and a metering pump pressure control referred to generally as 28. An extrudate stock material 29 in pellet or powder form is drawn continuously from a hopper 30 into a heated extruder barrel 31 by the action of a screw 32. The extruder stock material 29 comprises a thermoplastic such as polyethylene, PVC, ABS, cellulosics or polystyrene. The thermoplastic is heated in the barrel 31 to a plastic or liquid form and is forced by the continuous rotating motion of the screw from the barrel to the metering pump 26 which pumps the stock extrudate from the extruder 24 to the extrusion die block 22 at a constant volumetric rate (V/t). An extrudate output from the die block 22 comprises an elongated, thermoplastic article of relatively constant cross section. The cross section of the extrudate conforms to the cross section or profile provided by the extruder die 22. A continuous extruded body thus formed is passed through a cooling bath 34. The extrudate is uniformly cooled by this bath and is drawn through on a continuous basis past a longitudinal counter 35 by an extrudate puller 36. The extruded article is then cut to different lengths as desired.

The metering pump 26 is a constant volume pump which supplies the extrudate material in plasticized or liquid form to the extrudate die block 22 at a substantially constant volumetric rate (V/t). Pump 26 comprises a gear pump which pumps a known volume of fluid for each rotation of a pump drive shaft. The volume of fluid pumped is not dependent on the pressure at the inlet to the pump so long as a differential pressure existing across the pump is maintained which keeps pump chambers filled. Pumps of this type are known in the art and are employed in the manufacture of synthetic textile fibers. A drive shaft of the metering pump 26 is driven by an electric motor whose speed is regulated by a motor speed control 27. Since the metering pump is a constant volume pump, the pump gear rotation rate is representative of volumetric rate (V/t) at which material is delivered from the metering pump to the extruding die block 22. By sensing and controlling the rate of rotation (RPM) of the pump gear, the volumetric rate (V/t) of pumped material over the interval of time (t) is known and the volume pumped over an interval of time (t) can be determined. A RPM counter 38 is provided for counting the shaft rotations of the pump over the interval of time (t). This counter generates an electrical signal $E_{RPM}$ representative of the (RPM) which is applied over a line 39 to a controller 40. By maintaining this volumetric rate (V/t) substantially constant, the volume of extrudate stock material delivered to the die block 22 during the interval of time (t) can be determined and utilized, as indicated hereinafter, in determining an average dimensional characteristic ($M_a$) of the extrudate.

In addition to monitoring the metering pump rate (V/t), the linear rate of extrudate production is also determined. The rate (N/t) at which the extrudate is drawn from the cooling bath by the line puller 36 is provided by the line speed counter 35. The line speed counter provides an electrical signal $E_N$ representative of a measured dimensional characteristic (N) which is equal to the length of the extrudate over an interval of time (t). The signal $E_N$ is applied over a line 42 to the control means 40.

Control means 40 is provided for determining from the measured dimensional characteristic (N) as provided by the representative signal $E_N$ on line 42 and from the volumetric supply rate (V/t), as indicated by representative signal $E_{RPM}$ on line 39 an average value ($M_a$) of the extrudate first dimensional characteristic. In the case of the profile extrusion of FIG. 1, the average first dimensional characteristic ($M_a$) represents the cross sectional area (A) of the extrudate. For a given extrusion die profile, the extrudate will have an average cross sectional area representing the cross sectional area of the die itself as modified by acceptable tolerance variations and the effect of draw dependent on pullout speed. The profile area has a predetermined reference value ($M_{ar}$) which is introduced into the control means 40 in the form of an electrical signal $E_M$ from an entry register 44 via an input line 46. The control means 40 then operates to determine a measured average value ($M_a$), to compare this value with the measured reference value ($M_{ar}$) and to apply a correcting signal ($E_{c1}$) to the metering pump motor control 27 over line 47 for altering the metering pump rate. The signal $E_{c1}$ causes a change in the pump speed (RPM) for restoring ($M_a$) to the value of ($M_{ar}$). Alternatively, a similar correcting signal $E_{c2}$ is provided by the control means 40 and is applied over line 48 to the line speed puller 36 for varying the extrudate transport rate to restore the measured value ($M_a$) to the predetermined value ($M_{ar}$). Alternatively, both the volumetric rate and the line puller rate are altered by simultaneously generating signals $E_{c1}$ and $E_{c2}$ to effect the desired correction.

The control means 40 comprises a microprocesor control having a preprogrammed data processor which is adapted to continuously receive the input signals $E_{RPM}$ from the counter 38 and the signal $E_N$ from the line counter 35. As indicated hereinbefore, these signals are representative of the volume per unit time (V/t) of extrudate supplied to the die and to the length per unit time (N/t) of extrudate removed from the die, respectively. Since the profile of the extrudate is known, the average cross sectional area of the profile over interval of time (t) is determined from V and from N. The control means 40 compares this computed value with the predetermined value ($M_{ar}$) entered therein from the register 44. The correcting signal $E_{c1}$ is generated for restoring ($M_a$) to ($M_{ar}$). A correcting signal $E_{c2}$ is also generated and applied to the line puller 36.

In order that the computed value of $M_a$ be accurate, the metering pump 26 is required to deliver the extrudate to the extrusion die block 22 at a constant volumetric rate. The metering pump must therefore pump at a relatively constant volume per unit time. However, the extruder 24 does not provide a constant volume supply of stock material. Since the metering pump 26 is a constant volume device while the extruder 24 is not, then the metering pump 26 can be "starved" when the extruder 24 provides stock material at a relatively lower rate than required of the pump, or, alternatively the metering pump will be subjected to excessive pressure when the extruder provides stock material at a relatively greater rate. The metering pump is thereby subjected to extrudate stock supply variations which will interfere with the constant volume pumping. In order to provide a constant supply of extrudate to the metering pump 26, a means is provided for maintaining a desired differential pressure ΔP across the pump. The extrudate pressure at the inlets and outlets of the metering pump 26 is sensed and the extruder supply rate to the metering pump 26 is altered when the predetermined differential ΔP varies. This means for maintaining ΔP includes pressure sensitive pickups 50 and 52 at the inlet and outlet of the metering pump respectively, and a pressure detector and screw speed control 28 which operates to control the rate at which the extruder screw 32 rotates. Increasing the extruder screw rate of rotation increases the supply rate of stock material to the pump 26 while reducing the screw rate of rotation reduces the supply rate to the pump 26. When the differential pressure between the pickups 52 and 50 increases from the predetermined value, the pressure detector 28 senses a "starving" condition and causes the rate of the screw 32 to increase for restoring the differential pressure to the predetermined value. When the differential pressure across the metering pump is less than the predetermined value, the pressure detector senses an oversupply of extrudate to the pump and reduces the rotational speed of the screw 32 and the rate at which the extrudate stock material is supplied to the metering pump. A predetermined differential pressure is thereby established thus maintaining a desired volumetric supply rate from the metering pump. In a less preferred embodiment, the input pressure as measured at pickup 50 may be maintained constant.

FIG. 4 illustrates an alternative apparatus which is particularly adapted for controlling the average value of the thickness of a tubular extrudate 60. The apparatus of FIG. 4 includes elements performing functions similar to functions performed by elements of FIG. 1, as described hereinbefore, and such elements in FIG. 4 bear the same reference numerals. An outside diameter (P) of the tubing 60 is measured as the tubular extrudate is drawn from the cooling bath 34. The outside diameter (P) is continuously measured by a laser gauge 62. This measurement is performed at a single peripheral location. Alternatively, the gauge 62 comprises a photoelectric measuring gauge or a mechanical gauge operating an LVDT. These forms of gauges are well known in the art. The gauge 62 provides an output signal $E_P$ which is applied via a line 64 to the controller 40. Other input signals applied to the controller include the signal $E_N$ on line 42 and the signal $E_{RPM}$ on line 39. Input information in the form of electric signals is thus provided to the controller which are representative of the voluem (V) of material supplied during an interval of time (t), the length (N) of the extrudate formed during the interval of time (t) and the average outside diameter ($P_a$) of the tubing along the length (N). From the known cross sectional configuration the average thickness ($M_a$) of the tube over the length (N) is determined by the controller. This average value ($M_a$) of the tube thickness is compared with a predetermined average value ($M_{ar}$) of tube thickness entered into the controller from the register 44. Corrective signals $E_{c1}$ or $E_{c2}$ are applied to the metering pump control or to the line puller 36 for reducing any variation between ($M_a$) and ($M_{ar}$).

Figure 8:
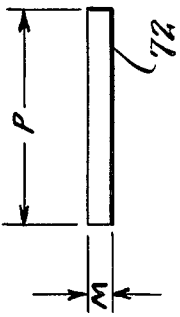
FIG. 8 is a front elevation view of a sheet extruded by the apparatus of FIG. 7.

FIG. 7 illustrates an apparatus in accordance with the invention for controlling the average thickness of an extruded sheet of material. Those elements of FIG. 7 which perform functions similar to elements of FIG. 1 bear the same reference numerals. The apparatus of FIG. 7 includes a gauge 70 for measuring the width (P) of an extruded sheet 72 (FIG. 8). The gauge 70 comprises a laser gauge or a photoelectric gauge as described hereinbefore with respect to the gauge 62 of FIG. 4. The gauge 70 provides an electrical signal ($E_p$) which is supplied to the controller via a line 74. This signal $E_p$ is representative of the width (P) of the sheet 72. In addition to the signal $E_p$, there is also provided the signal $E_N$ on line 42 and the signal $E_{RPM}$ on line 39. There is thus applied to the controller 40, electrical signals representative of the volume, the length, and the average width from which the average thickness ($M_a$) is determined by the controller. Variations occurring between the average thickness ($M_a$) and a predetermined average thickness ($M_{ar}$) is sensed and the controller generates a correction signal $E_{c1}$ for varying the volumetric rate (V/t) in order to restore ($M_a$) to the value of ($M_{ar}$).

In an alternative arrangement, the width (P) of the sheet 72 being extruded by the apparatus of FIG. 7 is measured. In this case, the gauge 70 is replaced by edge sensors 76 (FIG. 7) which are adapted to accurately sense the width of the extruded sheet. Edge sensors 76 are known in the art and the position of the edges of the sheet are sensed by the sensors in a well known manner. The edge sensors generate a signal $E_E$ which is applied over line 78 to controller 40. The width is therefore known and the microprocessor controller operates to determine from the input signals thereto the average sheet thickness ($M_a$) from the known cross sectional geometry of the sheet. The rate of operation of the metering pump 26 is then controlled by the control signal $E_{c1}$ in order to reduce variations between the determined average thickness ($M_a$) of the sheet 72 and the predetermined average thickness ($M_{ar}$) which is entered in the controller from the register 44.

Figure 10:
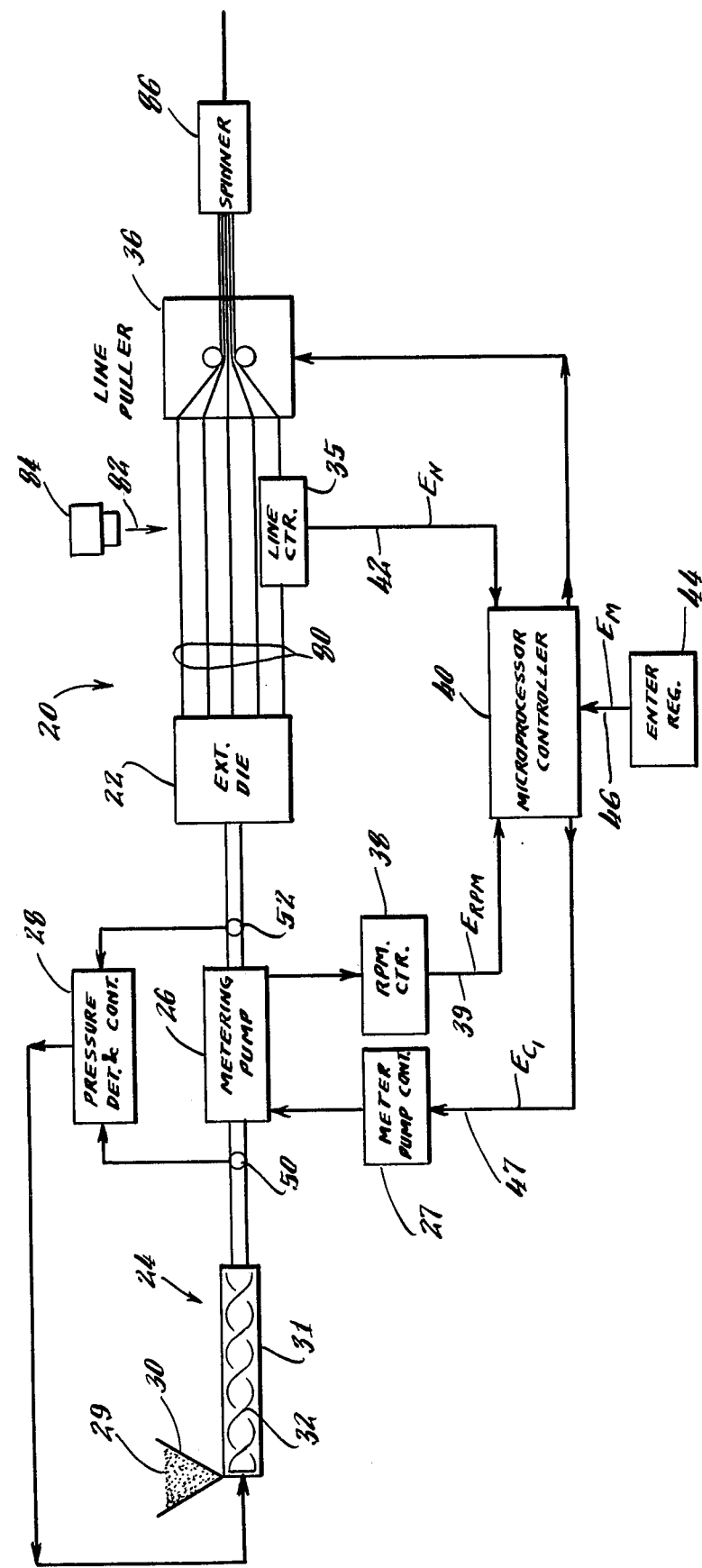
FIG. 10 is a schematic diagram of an apparatus constructed in accordance with features of this invention for controlling the average diameter of extruded fibers.

FIG. 10 illustrates the apparatus in accordance with the present invention for controlling the average denier of extruded yarn. In FIG. 10, components performing the same function as similar components of FIG. 1 bear the same reference numerals. The extrusion die 22 of FIG. 10 comprises a spinneret or die having a plurality of relatively small die orifices formed therein and through which a plurality of relatively small strands 80 are extruded. The strands are air cooled by a flow of air represented by arrow 82, directed at the extrudate from a blower 84. In FIG. 10, the spacing between the strands is exaggerated for clarity. In operation, the strands are relatively closely spaced but loosely bunched and are drawn by line puller 36 from the die and are fed therefrom to a spinner 86 by which they are wound into yarn. One or more of the extruded strands 80 are conveyed over a course through the line counter 35 which generates a signal $E_N$ on line 42 and which is applied to the controller 40. The controller determines the average denier or cross sectional diameter of a strand, from the volumetric rate provided by the signal $E_{RPM}$, from the length (N) of a strand extruded over the interval of time (t) provided by signal $E_N$ and from the known number of orifices for producing the plurality of strands 80. The average denier ($M_a$) is thereby determined and variations between ($M_a$) and an average value ($M_{ar}$) entered into the controller from the register 44 is sensed. The control signal ($E_1$) is generated for reducing these variations. Alternatively, the signal $E_{c2}$ is generated for altering the take off speed of the line puller 36 for similarly reducing the variations.

The aforesaid method and apparatus illustrate the use of a metering pump 26 after extruder 31 to supply a fixed output volume of material per unit of time. As set forth hereinbefore, measuring the line speed provides an indication of volume per unit length and by measuring one dimension, the more difficult cross sectional dimension of the article may be determined. The same result may be achieved by controlling the flow of material into the extruder 31.

Figure 11:
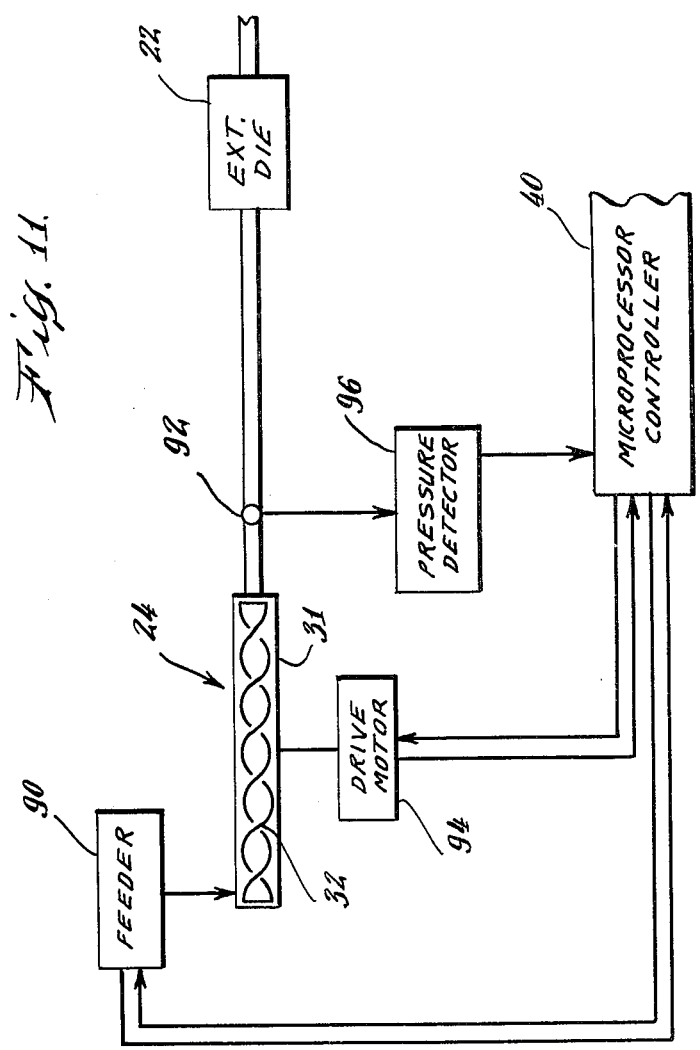
FIG. 11 is a partial schematic diagram of apparatus which may be utilized in the embodiments of FIGS. 1, 4, 7 and 10 illustrating the use of a controlled volumetric or gravimetric feeder in such embodiments.

FIG. 11 illustrates controlling the flow of material from a volumetric or gravimetric feeder 90 both of which are well known in the art. The output of the feeder 90 is supplied to the input of the extruder 24 and the plasticized or liquid output of the extruder is supplied to the extrusion die 22. When using this modification on the apparatus shown in FIGS. 1, 4, 7 and 10, the screw 32 of the extruder 24 must be maintained at the proper speed. To do so, a drive motor 94 for the screw 32 is monitored by the controller 40 and the melt pressure at the output 92 of the extruder 24 is sensed by a pressure detector 96 which is coupled to the controller 40. The feeding speed of the feeder 90 is also monitored by the controller 40. The controller regulates and matches the speeds of the feeder 90 and the extruder 24 to insure that the material supplied from the feeder 90 is accepted and fed through the extruder 24 to provide a substantially constant volumetric supply rate to the extrusion die 22. By knowing the weight or the volume of material supplied to the input of the extruder, the difficult to determine cross sectional dimension of the extruded output can be determined for various shapes in the same manner as set forth hereinbefore.

An improved method and apparatus has thus been described for indirectly determining and controlling an average dimensional characteristic of an elongated extruded article. While particular embodiments of the invention are disclosed herein, variations may be made thereto without departing from the spirit of the invention and the scope of the appended claims.

I claim:

1. A method of forming an extrudate having a not readily measurable linear cross-sectional dimension and of maintaining that dimension at a predetermined, average value comprising the steps of:
    A. supplying an extrudate stock at a substantially uniform volumetric rate to an extrusion die which provides an extrudate output therefrom of predetermined cross-sectional configuration, said extrudate having a first linear cross-sectional dimension which is subject to variation over an interval of time but which is not readily measurable;
    B. monitoring the extrudate stock supply rate;
    C. measuring the length of said extrudate output over said interval of time;
    D. directly measuring a second linear cross-sectional dimension over said interval of time;
    E. indirectly determining from said measured length, from the volumetric rate, from said second linear cross-sectional dimension and from said predetermined cross-sectional configuration, the average value of said extrudate first linear cross-sectional dimension during an interval of time;
    F. determining variations between said average value and a predetermined average value of said first linear cross-sectional dimension; and
    G. varying the extrudate stock supply rate to said die for restoring said average determined first linear cross-sectional dimension to said predetermined average value.

2. The method of claim 1 wherein said extrudate output from said die occurs at a line speed and said line speed is varied upon determination of a variation between said average value of said first linear cross-sectional dimension and said predetermined average value.

3. The method of claim 1 wherein said extrudate comprises a rod.

4. The method of claim 1 wherein said extrudate comprises a sheet of generally rectangular cross-sectional configuration, said first linear cross-sectional dimension comprises a thickness of said sheet, and said second linear cross-sectional dimension comprises a width of said sheet.

5. The method of claim 1 wherein said extrudate stock is supplied at a substantially uniform volumetric rate to said extruding die by an extruder being supplied by a gravimetric or volumetric feeder and including the step of controlling the flow of extrudate stock material from said feeder to said extruder for maintaining a uniform supply rate to said extrusion die.

6. The method of claim 1 wherein said extrudate stock is supplied at a substantially uniform volumetric rate to said extruding die by a pump means and including the step of maintaining a predetermined differential pressure between an inlet and an outlet of said pump means.

7. The method of claim 6 wherein said predetermined differential pressure is maintained by varying a flow rate of extrudate material to said pump means.

8. The method of claim 1 wherein said extrudate stock is supplied at a substantially uniform volumetric rate to said extruding die by a pump means and including the step of maintaining a predetermined input pressure at the inlet of said pump means.

9. The method of claim 8 wherein said predetermined input pressure is maintained by varying a flow rate of extrudate material to said pump means.

10. The method of forming an extrudate having a not readily measurable linear cross-sectional dimension and of maintaining that dimension at a predetermined, average value comprising the steps of:
   A. supplying an extrudate stock in liquid or plasticized form to a metering pump;
   B. conveying an extrudate stock output from said metering pump at a volumetric supply rate to an extrudate die;
   C. supplying an output extrudate from said extrudate die to a cooling means, said extrudate having a first linear cross-sectional dimension which is subject to variation, but which is not readily measurable;
   D. monitoring the extrudate stock supply rate;
   E. measuring the length of said extrudate over said interval of time;
   F. directly measuring a second linear cross-sectional dimension over said interval of time;
   G. supplying electric signals representative of said length and said second linear cross-sectional dimension to automatic controller means for indirectly determining from said length, from said second linear cross-sectional dimension, from the supply rate of said metering pump and from said predetermined cross-sectional configuration the average value of said extrudate first linear cross-sectional dimension;
   H. determining variations between said average value and a predetermined average value; and
   I. varying the rate of said metering pump for varying the extrudate stock volumetric supply rate to said die to restore said average value of said first linear cross-sectional dimension to said predetermined average value.

11. An apparatus for forming an extrudate having a not readily measurable linear cross-sectional dimension and for maintaining that dimension at a predetermined, average value comprising:
   A. an extrudate die adapted to provide an extrudate output therefrom upon the application thereof of an extrudate stock material in plasticized or liquid form;
   B. metering pump means for supplying an extrudate stock to said extrudate die at a substantially constant volumetric supply rate;
   C. means for supplying said extrudate stock material in liquid or plasticized form to said metering pump means;
   D. said extrudate die having an orifice for providing an elongated extrudate output body of predetermined cross-sectional configuration, said extrudate having a first linear cross-sectional dimension which is subject to variation over an interval of time, but which is not readily measurable;
   E. means for monitoring the extrudate stock supply rate and for generating an electrical signal representative of said supply rate;
   F. means for measuring and generating an electrical signal representative of the length of said extrudate over said interval of time;
   G. means for directly measuring and generating an electrical signal representative of a second linear cross-sectional dimension over said interval of time;
   H. means for indirectly determining from said measured length, from said metering pump supply rate from said second linear cross-sectional dimension and from said predetermined cross-sectional configuration an average value of said extrudate first linear cross-sectional dimension, for determining variations between said average value and a predetermined average value of said first linear cross-sectional dimension; and
   I. means for varying the extrudate stock supply rate to said die for restoring said average first linear cross-sectional dimension to said predetermined average value.

12. The apparatus of claim 11 including line pulling means for conveying said extrudate away from said die, said determining means adapted to vary an operating rate of said line pulling means when said determined average value of said first linear cross-sectional dimension varies from said predetermined average value.

13. The apparatus of claim 11 wherein a predetermined pressure differential is established between an inlet and an outlet of said metering pump and means are provided for maintaining said pressure differential at a predetermined value.

14. The apparatus of claim 13 wherein said extrudate supply means includes means for supplying said stock material to said pump at a predetermined rate and said means for maintaining said pressure differential is adapted for varying said supply rate for maintaining said pressure differential.

15. The apparatus of claim 11 wherein a predetermined pressure is established at the inlet of said metering pump and means are provided for maintaining said inlet pressure at a predetermined value.

16. The apparatus of claim 15 wherein said extrudate supply means includes means for supplying said stock material to said pump at a predetermined rate and said means for maintaining said inlet pressure is adapted for varying said supply rate for maintaining said inlet pressure.

17. The method of forming an extrudate having a tubular cross-sectional configuration and of maintaining a thickness of that extrudate at a predetermined average value even though that thickness is not readily measurable comprising the steps of:
   A. supplying an extrudate stock at a substantially uniform stock supply rate to an extrusion die which provides an extrudate output therefrom of tubular cross-sectional configuration, said tubular extrudate having a thickness which is subject to variation over an interval of time but which is not readily measurable;

B. monitoring the extrudate stock supply rate;

C. measuring the length of said tubular extrudate output over said interval of time;

D. directly measuring the outside diameter of said tubular extrudate over said interval of time;

E. indirectly determining from said measured length, from said measured outside diameter, from the stock supply rate and from said predetermined tubular cross-sectional configuration the average value of said extrudate thickness during an interval of time;

F. determining variations between said average value and a predetermined average value of said thickness, and G. varying the extrudate stock supply rate to said die for restoring said average determined thickness of said tubular extrudate to said predetermined average value.

18. An apparatus for forming an extrudate having a not readily measurable linear cross-sectional dimension and for maintaining that dimension at a predetermined, average value comprising:

A. an extruder means adapted to provide an extrudate output therefrom upon the application thereof of an extrudate stock material;

B. feeder means for supplying an extrudate stock material to said extruder at a substantially constant supply rate;

C. an extrudate die having an orifice for providing an elongated extrudate output body of predetermined cross-sectional configuration;

D. means for supplying said extrudate output from said extruder in liquid or plasticized form to said extrudate die;

E. said extrudate output from said extrudate die having a first linear cross-sectional dimension which is subject to variation over an interval of time, but which is not readily measurable;

F. means for monitoring the extrudate stock supply rate and for generating an electrical signal representative of said supply rate;

G. means for measuring and generating an electrical signal representative of the length of said extrudate over said interval of time;

H. means for directly measuring and generating an electrical signal representative of a second linear cross-sectional dimension over said interval of time;

I. means for indirectly determing from said measured length, from said feeder means supply rate, from said second linear cross-sectional dimension and from said predetermined cross-sectional configuration an average value of said extrudate first linear cross-sectional dimension, for determining variations between said average value and a predetermined average value of said first linear cross-sectional dimension; and J. means for varying the extrudate stock supply rate to said die for restoring said average first linear croos-sectional dimension to said predetermined average value.

19. The apparatus in claim 18 wherein said feeder means is a gravimetric feeder.

20. The apparatus in claim 19 wherein said feeder means is a volumetric feeder.

* * * * *